United States Patent
Cox, Jr. et al.

[15] 3,667,031
[45] May 30, 1972

[54] PHASE-LOCKED RESOLVER TRACKING SYSTEM

[72] Inventors: Duncan B. Cox, Jr., Manchester; Kenneth Fertig, Brookline; Donald E. Fulton, Everett, all of Mass.

[73] Assignee: Massachusetts Institute of Technology, Cambridge, Mass.

[22] Filed: Aug. 18, 1970

[21] Appl. No.: 64,781

[52] U.S. Cl..............................323/101, 323/109, 323/120, 328/155, 340/198
[51] Int. Cl..........................................................H03d 1/00
[58] Field of Search..................323/101, 105, 109, 120, 121; 340/195, 198, 315; 328/155

[56] References Cited

UNITED STATES PATENTS 3,478,357  11/1969  Bacon..................................340/198 X
3,577,088  5/1971   Goggins, Jr. ........................328/155 X
3,199,037  8/1965   Graves................................323/101 X Primary Examiner—Gerald Goldberg
Attorney—Thomas Cooch, Arthur A. Smith, Jr. and Martin M. Santa

[57] ABSTRACT

An improved phase-locked feedback loop which functions in conjunction with a resolver as an efficient and highly accurate tracking system for continually tracking the angle information in modulated resolver output waveforms. The improvement basically comprises a phase-locked loop incorporating as many phase-sensitive detectors as there are resolver outputs, each detector operating on one of the output windings of the resolver, the circuit being configured so as to provide resolver-angle to phase-angle conversion with substantially increased accuracy and performance improvement.

8 Claims, 2 Drawing Figures

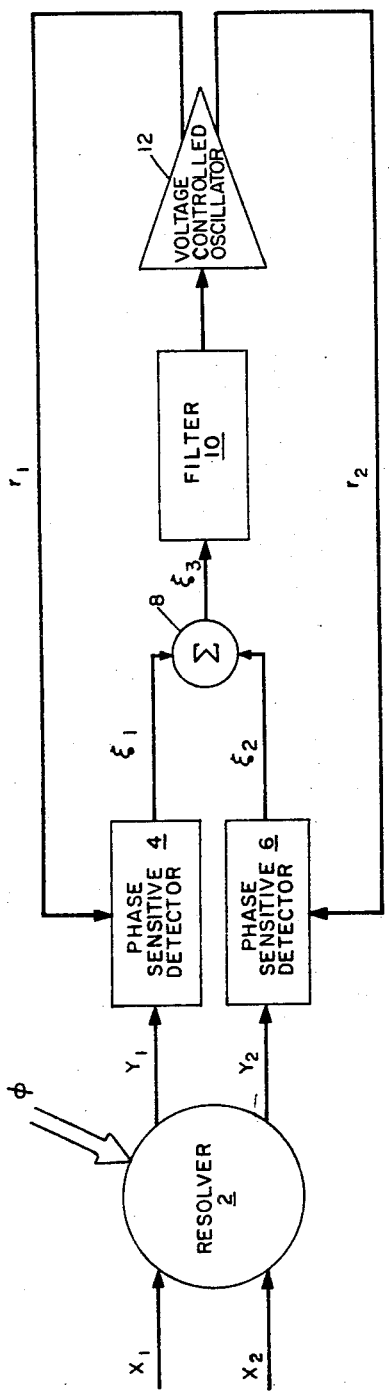
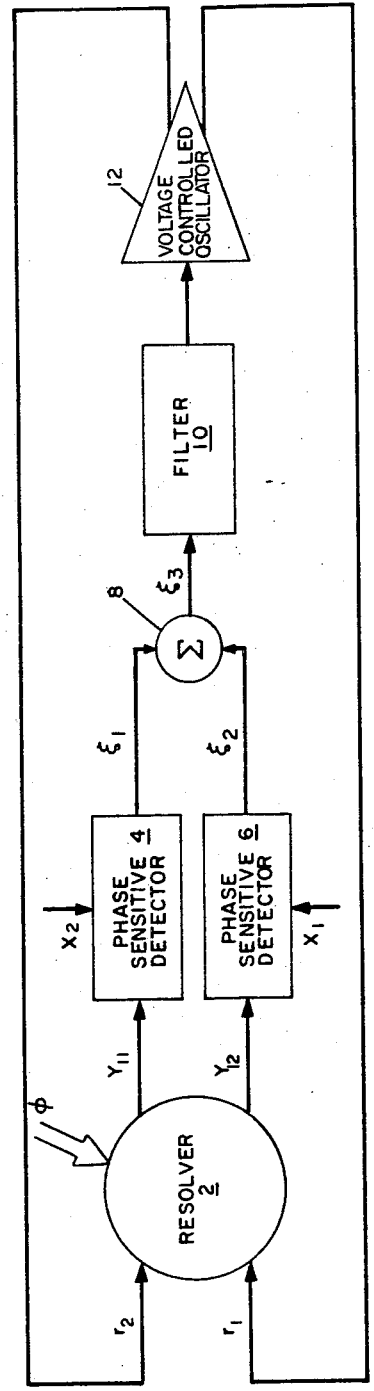
FIG. 1
FIG. 2
INVENTORS:
DUNCAN B. COX, JR.
KENNETH FERTIG
DONALD E. FULTON
BY Arthur A. Smith, Jr.
ATTORNEY

PHASE-LOCKED RESOLVER TRACKING SYSTEM

The invention herein described was made in the course of work performed under a contract with the Department of the Air Force.

BACKGROUND OF THE INVENTION

1. Field of the Invention

This invention relates generally to data acquisition and control systems and particularly to modulated carrier waveform tracking systems employing phase-lock techniques.

2. Description of the Prior Art

In the field of data acquisition and control, a prime task is to convert desired continuous information, such as the angle of a shaft, into modulated waveforms which can then be more easily converted into digital form, allowing processing by digital computer. A typical example of a transducer performing this task is a shaft-angle resolver which converts shaft-angle data into a phase-modulated waveform. The resolver is used in conjunction with a phase-locked loop in order to facilitate the analog-to-digital conversion process, to reject unwanted noise components, and for other reasons. The resolver and the phase-locked loop form the desired tracking system. Techniques using phase-locked loops are well known in the art. (See, for example, "Phaselock Techniques", by Floyd M. Gardner, John Wiley and Sons, Inc., New York, N.Y., 1966.) A discussion of phase-locked loops can also be found in copending patent application entitled "Electronic Instrument Servo", Ser. No. 764,505, filed Oct. 2, 1968 by Duncan B. Cox, Jr., and Kenneth Fertig and assigned to a common assignee.

In its most basic form the phase-locked loop consists of a phase-sensitive detector, a low-pass filter and a voltage-controlled oscillator. The resolver, used in conjunction with this loop to form a shaft-angle tracking system, is excited by two time-quadrature excitations on its inputs, $x_1 = \cos \omega t$, $x_2 = \sin \omega t$. The single output of the resolver, which is linearly phase-modulated by the resolver mechanical angle $\phi$, is coupled to one input of the phase-sensitive detector. The detector's output, in turn, is filtered and fed to a voltage-controlled oscillator, the output of which is fed back to the second input of the phase-sensitive detector. The basic phase-locking operation of the loop depends upon the action of the phase-sensitive detector in producing an error signal to increase or decrease the frequency of the oscillation of the voltage-controlled oscillator in order to drive the phase error to zero. The output of the phase-locked loop, which is the feedback waveform from the voltage-controlled oscillator, in normal operation is locked in frequency and phase to the input of the phase-locked loop (from the resolver), and it continually tracks the phase of the input waveform.

Generally, the output of the phase-sensitive detector contains, in addition to the desired signal proportional to the tracking error, an unwanted oscillating component (so-called "ripple") which, because only approximate cancellation techniques are available, must be attenuated by filtering. The filtering restricts the response time and acquisition range of the phase-locked loop by reducing the bandwidth of the loop and extending its acquisition time. If the ripple is not filtered or attenuated to negligible levels, it will be seen as time variation (so-called "jitter") in the loop phase. When a wide bandwidth is desired in combination with low jitter, some attempt at cancelling the ripple must be made; but none of the presently available cancellation techniques perform as well as might be desired. A major difficulty with even the best cancellation techniques known to be available is that cancellation is completely effective only when the tracking error is zero. The cancellation is largely ineffective when the loop is out of lock (e.g., during signal acquisition), and acquisition is likely to be retarded by the presence of the ripple. Another difficulty is that cancellation requires a prior knowledge of the amplitude of the signal at the input to the phase-sensitive detector. Variations in the amplitude, e.g., due to replacing resolvers or to variations in the rate of rotation, degrade the cancellation process.

In addition to the aforementioned problem of ripple, the basic phase-locked loop, when employed with a resolver to form a tracking system, is also extremely sensitive to amplitude and phase misadjustments of the resolver excitations. An amplitude or phase misadjustment produces a periodic tracking error whose peak amplitude is proportional to the misadjustment. Consequently, accurate tracking, using the basic loop, requires very stringent specification on the amplitude and phase of such excitations.

An alternative scheme has been proposed by G.L. Baldwin, et al., in "A Wide Band Phase-Locked Loop Using Harmonic Cancellation," Proceedings IEEE, Aug. 1969, pp. 1464–1465. It employs a unity-gain 90° phase shifter and extra phase detector in conjunction with the basic phase-locked loop. The resolver is excited by two time-quadrature excitations $x_1 = \cos \omega t$, $x_2 = \sin \omega t$.

In this scheme, the single output of the resolver is connected to two different phase-sensitive detectors; i.e., the resolver output is directly coupled to a first phase-sensitive detector, and simultaneously its phase is shifted via a phase shifter by ninety degrees, and the phase-shifted signal is fed to a second phase-sensitive detector. The output signals of both detectors are then summed in a summer, the output of which is filtered and coupled to a voltage-controlled oscillator having two separate outputs. The outputs from the oscillator are coupled back to their corresponding phase-sensitive detectors. The ripple from the first phase-sensitive detector is 180 degrees out of phase with the ripple from the second phase-sensitive detector, so ripple cancellation occurs in the summer. Ideally, this scheme overcomes one of the aforementioned drawbacks in the previously described example of the prior art, concerning the necessity of ripple cancellation, but the scheme does not overcome the drawback that the excitations must be accurately matched both in amplitude as well as in quadrature.

A problem in the case of this ripple cancellation scheme is that ideal 90° phase shifters do not exist. In practice, even reliable phase shifters exhibit appreciable changes in phase and amplitude as functions of frequency and environmental factors, and such changes in phase affect the average loop phase as well as the jitter. Moreover, the dynamic response of the phase shifter to noise and to time variations in the resolver phase angle degrade the performance of the loop.

Consequently, the various types of phase-locked resolver tracking systems utilizing a resolver with quadrature excitations and one output winding generally tend to lack the desired tracking accuracy which is required in high precision applications.

Because any system utilizing a phase-modulated resolver output is sensitive to phase shifts due to electrical energy storage mechanisms in the resolver and other transmission paths, the resolver is often operated with only one excitation to provide two outputs, amplitude modulated by sine and cosine functions, respectively, of the shaft angle and hereafter referred to as resolver-modulated outputs. However, with conventional techniques, conversion of resolver-modulated waveforms to digital information is relatively cumbersome in comparison with phase-to-digital conversion. To facilitate the digital conversion process a resolver-to-phase conversion network is often employed, but it introduces appreciable additional static and dynamic errors.

In practice, resolver-modulated signals require more complicated processing electronics than do phase-modulated signals. A wide range of resolver-to-digital converters have been invented and used extensively, but they are all substantially more complicated and expensive than readily available techniques for phase-to-digital conversion. Hence, attempts have been made in the past to design simple resolver-to-phase converters. The only known method has been to shift the phases of the carriers of the resolver-modulated signals relative to each other by 90° and to add the resulting waveforms to provide a phase-modulated waveform. This technique, while extremely simple, has several disadvantages. If the values of the circuit elements are not accurately matched, substantial static errors can result. Such errors are periodic functions of the resolver mechanical angle. Moreover, since ideal phase-shifting networks do not exist, the implemented networks result in a substantial amount of dynamic distortion.

SUMMARY

In view of the foregoing limitations of presently available resolver tracking systems employing phase-locked loop techniques, it is a general object of the invention to provide an improved phase-locked resolver tracking system with increased tracking accuracy.

It is another object of the invention to provide an improved phase-locked resolver tracking system utilizing a resolver with quadrature excitations and phase-modulated output signals which is relatively insensitive to mismatch in amplitude and to departure from quadrature phase-relationships of the excitations.

It is another object of the invention to provide an improved phase-locked resolver tracking system utilizing phase-modulated resolver output signals with a loop error signal containing no harmonic ripple components, hence, having a shorter response time, greater acquisition range and wider bandwidth than in previously known tracking systems.

It is another object of the invention to provide an improved phase-locked resolver tracking system utilizing phase-modulated resolver output signals and dual phase detectors, wherein the system is relatively insensitive to mismatch in the detector gains and departure from quadrature relationships of the feedback waveforms.

It is another object of the invention to provide an improved phase-locked resolver tracking system utilizing phase-modulated resolver output signals, wherein the system incorporates a ripple cancellation technique independent of the process of signal acquisition and not requiring a prior knowledge of the detector input signal amplitude.

It is still another object of the invention to provide an improved phase-locked resolver tracking system utilizing resolver-modulated resolver output signals while performing resolver-to-phase conversion without substantial static and dynamic errors inherent in conventional conversion networks.

These and other objects are met by a resolver tracking system containing a feedback loop having as many channels as there are resolver outputs. Each channel comprises a separate phase-sensitive detector to which a resolver output signal is fed, the channels further comprising a common summer, filter and voltage-controlled oscillator. Each phase-sensitive detector, which is basically a multiplier, continuously compares the phase $\phi$ of a resolver output signal and the phase $\theta$ of an output from the voltage-controlled oscillator. The difference between phases of those signals multiplied by the product of the amplitudes of the phase-sensitive detector's inputs represents an error signal. The error signals, which are the output signals of the phase-sensitive detectors are summed or subtracted in the summer and the resulting error signal is filtered and controls the frequency of the voltage-controlled oscillator. Thus, the phase of the output signal of the voltage-controlled oscillator in each channel continuously tracks the mechanical angle $\phi$ of the resolver.

As will be shown in the detailed description of the preferred embodiment, if a resolver with time-quadrature excitations is utilized, having two outputs, the system operates as a phase-angle tracking system. If a resolver with single-phase excitation is utilized, the system operates as a resolver-to-phase converter. This is the second form of the invention.

Further objects and advantages of the present invention and a better understanding thereof will become apparent in the following detailed description taken in conjunction with the accompanying drawings.

FIG. 1 is a flow diagram of a preferred embodiment of subject invention utilizing two resolver outputs.

FIG. 2 is a flow diagram of an alternate embodiment of subject invention in which the resolver is incorporated within the feedback loop.

PREFERRED EMBODIMENT

A preferred embodiment of the invention is shown in the flow diagram of FIG. 1. Since all of the components used are standard in the art, no attempt is made to detail them further.

As noted in FIG. 1, resolver 2 has two inputs $x_1$, $x_2$ and two outputs $y_1$, $y_2$, the first output $y_1$ being applied to first phase-sensitive detector 4 and the second output $y_2$ being applied to second phase-sensitive detector 6. The outputs $\xi_1$, $\xi_2$ of both phase-sensitive detectors are connected respectively to two separate inputs of summer 8, the output $\xi_3$ of which is filtered by filter 10 and applied to voltage-controlled oscillator 12. One output $r_1$ of voltage-controlled oscillator 12 is connected, in turn, to a second input of phase-sensitive detector 4 while the second output $r_2$ of oscillator 12 is connected, analogously, to a second input of phase-sensitive detector 6.

The operation of the preferred embodiment is as follows:

The input windings of resolver 2 at a mechanical angle $\phi$ are excited with excitation signals $x_1 = \cos \omega t$ and $x_2 = \sin \omega t$. Both resolver output waveforms $y_1$, $y_2$ are phase-modulated, but one lags the other $$y_1 = x_1 \cos \phi + x_2 \sin \phi = \cos(\omega t - \phi) \quad (1)$$
$$y_2 = -x_1 \sin \phi + x_2 \cos \phi = \sin(\omega t - \phi) \quad (2)$$

As aforementioned, output $y_1$ is the input to phase-sensitive detector 4, while output $y_2$ is the input to phase-sensitive detector 6 (the detectors being multipliers). The outputs $\xi_1$, $\xi_2$ of phase-sensitive detectors 4 and 6, which represent the first and second error voltage, are summed in summer 8 to form the third error voltage $\xi_3$, which is then filtered via filter 10. The filtered error signal controls the frequency of voltage-controlled oscillator 12. Voltage-controlled oscillator 12 generates both sinusoidal and cosinusoidal tracking signals, $$r_1 = -\sin(\omega t - \theta) \quad (3)$$
$$r_2 = \cos(\omega t - \theta) \quad (4)$$

where $\omega$ is the nominal center frequency and where $d\theta/t$ would represent the frequency variation under control of the input signal. The signals $r_1$ and $r_2$ are used as reference waveforms for the phase-sensitive detectors, signal $r_1$ being coupled back to detector 4 and signal $r_2$ being coupled back to detector 6.

As aforementioned, the embodiment as described and as shown in FIG. 1 is relatively insensitive to mismatches in excitation amplitudes and detector gains and to departures from the ideal quadrature relationships of the excitations and the feedback waveforms. The reason is that the resulting errors in phase-modulation of the two resolver outputs are second-harmonic functions of $\phi$ that substantially cancel when the double phase-detection process is used. The reason for the cancellation is that the 90° spatial relationship of the output windings results in a 180° shift in one second-harmonic error function with respect to the other. As was previously stated, in the basic phase-locked loop tracking system, the tracking error caused by amplitude misadjustments of the resolver excitation produces a tracking error whose peak amplitude is proportional to the misadjustment. In the embodiment shown in FIG. 1, the peak tracking error resulting from an amplitude misadjustment of the resolver excitations is proportional to the product of the resolver excitation amplitude misadjustment and the phase-detector gain misadjustment. For example, if the embodiment of FIG. 1 has a 2 percent resolver excitation amplitude misadjustment and a 2 percent phase detector gain misadjustment, the tracking error will be as low as a basic phase-locked loop tracking system with resolver excitation amplitudes matched to 0.04 percent.

The invention in the embodiment of FIG. 1 as described above also has the advantage that the error signal $\xi_3$, the sum of the outputs of the phase-sensitive detectors, contains no ripple component at the carrier frequency or multiple thereof. The error signal is given by $$\xi_3 = [\cos \omega t \cos \phi + \sin \omega t \sin \phi][-\sin(\omega t - \theta)] + [-\cos \omega t \sin \phi + \sin \omega t \cos \phi][\cos(\omega t - \theta)] \quad (5)$$

The first and second terms of Equation (5) represent the outputs of phase-sensitive detectors 4 and 6, respectively. Each contains a second-harmonic ripple component. But the summation process (via summer 8) cancels the ripple components to yield simply $$\xi_3 = \sin(\theta - \phi) \quad (6)$$

Because no high-frequency ripple terms are present, the double phase-detection process results in an instantaneous indication of $\sin(\theta - \phi)$, and the process can be considered an instantaneous phase detection.

In the above-described new ripple cancellation process the ripple is cancelled regardless of the value of the error $(\theta - \phi)$ and regardless of the amplitude of the resolver outputs. The new ripple cancellation process is effective during signal acquisition operations of the loop and is not degraded by output amplitude changes due to speed changes of the resolver. Further advantages of this process are that no phase-shifter network is needed. Dynamic and static errors due to the inevitably non-ideal operation of a phase shifter are not present. Discrimination against noise is more effective with the two resolver output signals available than when a phase shifter with its own filtering properties must be introduced.

As previously pointed out, utilizing a resolver in such a way as to provide resolver-modulated (sine-cosine-modulated) outputs rather than phase-modulated outputs can be advantageous for some applications. This second form of the invention is described.

When the amplitude of one of the excitations of resolver 2 shown in FIG. 1 is set equal to zero, the resolver produces the desired resolver-modulated outputs and the tracking system continues to function essentially without error. This can be demonstrated as follows:

The resolver outputs are, as usual $$y_1 = x_1 \cos\phi + x_2 \sin\phi \quad (7)$$
$$y_2 = -x_1 \sin\phi + x_2 \cos\phi \quad (8)$$

But with the excitations, $$x_1 = \cos \omega t \quad (9)$$
$$x_2 = 0 \quad (10)$$

the outputs are resolver-modulated, rather than phase-modulated $$y_1 = \cos \omega t \cos\phi \quad (11)$$
$$y_2 = -\cos \omega t \sin\phi \quad (12)$$

The output of the phase detectors 4 and 6 in FIG. 1 are then, respectively, $$\xi_1 = y_1 r_1 = [\cos \omega t \cos\phi][-\sin(\omega t - \theta)] \quad (13)$$
$$\xi_2 + y_2 r_2 = [-\cos \omega t \sin\phi][\cos(\omega t - \theta)] \quad (14)$$

The sum of these signal is the error signal $$\xi_3 = \xi_1 + \xi_2 = -[\cos \omega t][\cos\phi \sin(\omega t - \theta) + \sin\phi \cos(\omega t - \theta)]$$
$$= -\cos \omega t \sin(\omega t - \theta + \phi) = -\tfrac{1}{2}\sin(2\omega t - \theta + \phi) + \tfrac{1}{2}\sin(\theta - \phi) \quad (15)$$

The loop drives the average value of the error signal to zero, so that $$\xi_3 = -\tfrac{1}{2}\sin(2\omega t - \theta + \phi) + 0 \quad (16)$$

and $$\theta = \phi \quad (17)$$

Hence, the tracking system in this second form of the invention of FIG. 1 does result in the phase angle $\theta$ tracking the mechanical angle $\phi$.

When the tracking error $(\theta - \phi)$ is zero an unmodulated second-harmonic ripple component remains in the error signal $$\xi_3 = -\tfrac{1}{2}\sin 2\omega t \quad (18)$$

Hence, there is no natural ripple cancellation process in the second form of the invention (i.e., resolver-modulated), in contrast with the first form (i.e., phase-modulated). However, ripple cancellation and filtering can be employed to reduce the resulting phase jitter to tolerable levels as in the systems in the previous art.

The invention using resolver-modulated resolver outputs incorporates the advantage, mentioned in a previous section, inherent in the resolver-modulated waveforms, i.e., relative insensitivity to extraneous phase shifts. The invention also has the ability to operate over extremely wide ranges of angular velocities.

Each resolver-modulated output of the resolver can be considered as consisting of the sum of two phase-modulated components $$y_1 = \cos \omega t \cos\phi = \tfrac{1}{2}\cos(\omega t + \phi) + \tfrac{1}{2}\cos(\omega t - \phi) \quad (19)$$
$$y_2 = -\cos \omega t \sin\phi = -\tfrac{1}{2}\sin(\omega t + \phi) + \tfrac{1}{2}\sin(\omega t - \phi) \quad (20)$$

If the outputs of phase-sensitive detectors 4 and 6 represented in FIG. 1 are added in summer 8, the two phase-modulated components with arguments $(\omega t - \phi)$ are tracked. If the outputs are subtracted, the two components with arguments $(\omega t + \phi)$ are tracked. If two tracking systems are in operation simultaneously, the first system tracking the $(\omega t - \phi)$ components and the second system tracking the $(\omega t + \phi)$ components, the phase difference between the two tracking systems is $2\phi$ independent of the value of $\omega$ or any extraneous phase shifts. The phase of one tracking system may be used as a phase reference in conjunction with the other tracking system to allow recovery of the twofold phase-encoded information $2\phi$.

The use of two tracking systems allows the resolver signal to be tracked over an unusually wide range of angular velocities. Further analysis including the effects of finite rates of resolver rotation $\dot\phi$ shows that the components with arguments $(\omega t - \phi)$ and $(\omega t + \phi)$ have amplitudes proportional to $(\omega - \dot\phi)/\omega$ and $(\omega + \dot\phi)/\omega$, respectively. Hence, when $\dot\phi$ is equal to plus or minus $\omega$ only two of the components will have zero amplitudes, and only one of the two tracking systems will cease to track properly. Having both systems in operation simultaneously can insure that at least one is operating without error even in the extreme case where the magnitude of resolver rotation $\dot\phi$ approaches, or exceeds $\omega$. When only one loop is operating without error, the resolver excitation waveform must be supplied independently as a phase reference in order to allow recovery of the phase-encoded information.

ALTERNATE EMBODIMENTS

For some applications an alternate embodiment of both the first and second form of the present invention can be advantageous. While the above-described embodiment of the invention would be used in general, alternate configurations are attractive when the resolver outputs are to be sent over a transmission channel with other data. The alternate configurations decrease the dynamic frequency range of the resolver outputs, thus reducing the amount of channel capacity needed by the resolver output signals. These alternate configurations of the present invention are described further and shown in FIG. 2. Since the basic configuration of the components in FIG. 2 is identical to that shown in FIG. 1, the further description of the embodiment of FIG. 2 will be restricted to those components and functions which differ from the embodiment of FIG. 1.

As shown in FIG. 2, in the alternate embodiment of the first form of the invention (to wit, phase-modulated resolver outputs) one input of resolver 2 is excited by tracking signal $r_2$ while the other input of resolver 2 is excited by tracking signal $r_1$, both tracking signals being generated by voltage-controlled oscillator 12 and having the same form as in the embodiment of FIG. 1. The second input signal of phase-sensitive detector 4 is replaced by the reference signal $x_2 = \cos \omega t$ and the second input signal of phase-sensitive detector 6 is replaced by the reference signal $x_1 = \sin \omega t$.

As from the foregoing description the only difference between the embodiments of FIG. 1 and FIG. 2 is that excitation signals of the resolver and of the phase-sensitive detector have been interchanged. It will be shown by the following derivation how the alternate embodiment of the first form of the invention shown in FIG. 2 is related to the preferred embodiment of the first form shown in FIG. 1.

The resolver output signals of the above-described preferred embodiment of FIG. 1 were:

$$y_1 = x_1 \cos\phi + x_2 \sin\phi \quad (1)$$
$$y_2 = -x_1 \sin\phi + x_2 \cos\phi \quad (2)$$

The error signal is as before $$\xi_3 = \xi_1 + \xi_2 = y_1 r_1 + y_2 r_2 =$$
$$= [x_1 \cos\phi + x_2 \sin\phi][r_1] + [-x_1 \sin\phi + x_2 \cos\phi][r_2] \quad (21)$$

By re-arranging the terms, Equation (21) can be rewritten as follows:

$$\xi_3 = [r_2 \cos\phi + r_1 \sin\phi][x_2] + [-r_2 \sin\phi + r_1 \cos\phi][x_1] \quad (22)$$

A comparison of Equation (22) with Equation (21) reveals that $r_2$ may be interchanged with $x_1$, and $r_1$ may be interchanged with $x_2$ without changing the basic form of Equation (21). This implies that interchanging the output signals of voltage-controlled oscillator 12, which are the tracking signals $r_1$, $r_2$, and of $x_1$, $x_2$ reference signals will not affect the tracking ability or even the dynamic characteristics of the loop.

Since the alternate embodiment of FIG. 2 is mathematically equivalent to the preferred embodiment of FIG. 1, it retains the advantages of the preferred embodiment over phase-locked tracking systems in the previous art.

In the alternate embodiment shown in FIG. 2, the resolver output signals are designated $y_{11}$ and $y_{12}$, and they represent waveforms different from the resolver output signals $y_1$, $y_2$ of FIG. 1.

$$y_{11} = r_2 \cos \phi + r_1 \sin \phi = \cos(\omega t + \phi - \theta) \quad (23)$$
$$y_{12} = -r_2 \sin \phi + r_1 \cos \phi = -\sin(\omega t + \phi - \theta) \quad (24)$$

The above-mentioned difference has been caused by replacement of the resolver excitation having fixed frequency by the tracking signals with variable frequencies.

In resolver tracking operation the phase angle $\theta$ is driven toward the mechanical angle $\phi$ so the resolver outputs are nominally $\cos \omega t$ and $-\sin \omega t$ regardless of resolver rotation rate. Thus, in the alternate embodiment of the first form of the invention, the dynamic frequency range of the resolver outputs has been decreased while the dynamic frequency range of the resolver excitations has been increased. Since it is difficult to frequency-multiplex a signal with wide frequency range, the movement of the wide ranging signal from the resolver output to its input may, in some cases, be desirable.

It is clear from the mathematical similarity of the embodiments of FIG. 1 and FIG. 2 that the alternate embodiment of FIG. 2 shares the principal advantages of the preferred embodiment of FIG. 1 over phase-locked resolver tracking systems in the previous art, e.g., insensitivity to excitation amplitude and to phase-detector mismatch, insensitivity to the lack of a quadrature relationship between resolver excitations, a lack of a ripple component in the error signal, and so forth.

The alternate embodiment of the second form of the invention will be described very briefly because it is related to the alternate embodiment of the first form in the same way that the preferred second form is related to that of the preferred first form. In this embodiment, the block diagram is the same as that of FIG. 2, except that $r_2$ has been set equal to zero. Substituting $r_2 = 0$ (25)
into Equation (22) we find the error signal of this embodiment $$\xi_3 = r_1 \sin \phi \, [x_2] + r_1 \cos \phi \, [x_1] \quad (26)$$

Substituting for $r_1, x_1$ and $x_2$ $$r_1 = -\sin(\omega t - \theta) \quad (6)$$
$$x_1 = \cos \omega t \quad (27)$$
$$x_2 = \sin \omega t \quad (28)$$

$$\xi_3 = -\sin(\omega t - \theta)\sin\phi\sin\omega t - \sin(\omega t - \theta)\cos\phi\sin\omega t \quad (29)$$

Simplifying
$$\xi_3 = \tfrac{1}{2}\sin(\theta - \phi) - \tfrac{1}{2}\sin(2\omega t - \phi - \theta) \quad (30)$$
The loop drives the first term to zero so
$$\theta = \phi \quad (31)$$

The alternate embodiment of the second form of the invention has the same tracking ability as the preferred embodiment of the second form but slightly different dynamics because its ripple is different.

ADDITIONAL CAPABILITIES OF THE INVENTION

The present invention may utilize a resolver with three or more outputs to form a resolver angle tracking system. Such a system has as many phase-sensitive detectors and feedback signals from the voltage-controlled oscillator as the resolver has outputs. Each resolver output and feedback signal from the voltage-controlled oscillator is an input to a respective phase-sensitive detector, and the outputs of the phase-sensitive detectors are summed to form the loop error signal. The phase difference between the feedback signals is the same as the angular difference between the resolver output windings.

For example, utilizing a resolver with a single excitation and three output signals, which resolver is known as a synchro, the loop tracks the resolver mechanical angle $\phi$ with an offset of 90°. It is possible to show, utilizing corresponding equations describing the function of this embodiment, that the loop error signal in this case has the same basic form as in previously described second form of the invention utilizing a resolver with one input and two output signals.

The tracking system of the synchro provides synchro-to-phase conversion with high accuracy and wide bandwidth, thus facilitating synchro-to-digital conversion. This embodiment of the present invention eliminates the need for a bulky precision transformer or a summing and differencing operational amplifier circuit which are used in virtually all previously known synchro-to-digital converters. Similarly, if a second excitation is applied to the aforementioned synchro, which is in time quadrature with the first resolver excitation, the loop tracks again the shaft angle $\phi$ with a 90° offset, and, in this case, there is no ripple term.

Like the preferred embodiment of the invention, the above-described embodiment is insensitive to amplitude and phase errors in the resolver excitations, phase errors in the feedback waveforms and gain errors in the phase detectors.

Further, the invention can be generalized to provide useful tracking systems for a wide variety of modifications. Although the excitations and feedback waveforms are shown as being sinusoidal (or cosinusoidal), other waveshapes can be generated advantageously. Particularly, square waves may be used because they can be generated more easily and with great accuracy. Switched waveforms, such as pulse-width-modulated waveforms, approximating sine waves are also useful. Similarly, it may be advantageous to use a resolver with characteristics that are not exactly sinusoidal.

Although the tracking system has been described throughout the specification in conjunction with a resolver, it is understood that the invention will function equally as well if the resolver is replaced by other apparatus of a type which generates modulated waveforms.

Generally, if a tracking error is to be avoided, the excitations, resolver characteristics and feedback waveshapes must be especially selected as a consistent set.

The resolver-to-phase converter utilizing amplitude-modulated resolver outputs according to the invention can readily be extended to form a resolver angle-to-digital converter that is more effective and simpler than previously known converts. This could be achieved, for example, by using the strobing process of the aforementioned co-pending patent application Ser. No. 764,505 to provide digital encoding of the loop phase angles.

In the same manner the resolver angle tracking converter utilizing phase-modulated resolver outputs can, according to the invention, be readily extended to form a resolver angle-to-digital converter that is more accurate and has better dynamic response than previously known converters. Although the use of filter 10 in FIG. 1 is preferred, the invention will function without it, but with some degradation.

The voltage-controlled oscillator of the invention may be implemented by a voltage-controlled oscillator driving a countdown with the feedback signals derived from the countdown. Both the first and second forms of the invention continue to function as phase-locked tracking systems if the voltage-controlled oscillator is replaced by a circuit with two outputs in quadrature and the phase of the outputs is a function of an input voltage.

Other modifications of the invention herein described will occur to those skilled in the art. All such modifications are considered to be within the spirit and scope of the invention as defined.

Having thus described our invention, we claim:

1. A phase-locked tracking system for continuously tracking modulated output waveforms, said tracking system comprising in combination:
   a. resolving means having at least one input, excited by at least one first excitation signal and generating at least two modulated output waveforms;
   b. at least two phase-sensitive detectors, each of said detectors having a first input and a second input, wherein said first input is adapted to receive one of said modulated output waveforms and said second input is adapted to receive a second excitation signal, each of said detectors generating an error voltage that is a product of said modulated output waveform and said second excitation signal;
   c. a summer coupled to said phase-sensitive detectors for summing said error voltages and producing a resulting error voltage;
   d. a voltage-controlled oscillator coupled to said summer and generating at least one tracking signal, the output phase of said tracking signals being controlled by said resulting error voltage so as to minimize said resulting error voltage; and
   e. means of selectively coupling said tracking signals to one of said inputs of said resolving means and said second inputs of said phase-sensitive detectors.

2. The phase-locked tracking system of claim 1 further including a filter coupled to said summer and voltage-controlled oscillator.

3. The phase-locked tracking system of claim 1 wherein said resolving means is excited by two excitation signals in time-quadrature and generates two phase-modulated output waveforms, one lagging the other by 90°, said system comprising two phase-sensitive detectors.

4. The phase-locked tracking system of claim 1 wherein said resolving means is excited by one excitation signal and generates two resolver-modulated output waveforms, said system comprising two phase-sensitive detectors.

5. The phase-locked tracking system of claim 1 wherein said tracking signals are coupled to said second inputs of said phase-sensitive detectors, thereby constituting said second excitation signals.

6. The phase-locked tracking system of claim 1 wherein said tracking signals are coupled to said inputs of said resolving means, thereby constituting said first excitation signals.

7. The phase-locked tracking system of claim 1 wherein said resolving means is a resolver.

8. A phase-locked resolver tracking system for continuously tracking the modulated resolver output waveforms, said tracking system comprising in combination:
   a. a resolver having at least one input, excited by at least one first excitation signal and generating at least two modulated output waveforms;
   b. two phase-sensitive detectors, each of said detectors having a first input and a second input, wherein said first input is adapted to receive one of said modulated output waveforms and said second input is adapted to receive a second excitation signal, each of said detectors generating an error voltage that is a product of said modulated output waveform and said second excitation signal;
   c. a summer coupled to said phase-sensitive detectors for summing said error voltages and producing a resulting error voltage;
   d. a voltage-controlled oscillator coupled to said summer and generating at least one tracking signal, the output phase of said tracking signals being controlled by said resulting error voltage so as to minimize said resulting error voltage; and
   e. means of selectively coupling said tracking signals to one of said inputs of said resolver and said second inputs of said phase-sensitive detectors.

* * * * *